(12) United States Patent
Eynard et al.

(10) Patent No.: US 7,039,401 B2
(45) Date of Patent: May 2, 2006

(54) PHYSICAL PRIVATE MOBILE TELECOMMUNICATIONS NETWORK

(75) Inventors: Carlo Eynard, Turin (IT); Guglielmo Tomaselli, Turin (IT); Salvatore Riccobono, Chieti Scali (IT)

(73) Assignees: Telecom Italia, Milan (IT); MMA-Marconi Moblie Access S.p.A., Chieti Scali (IT)

( * ) Notice: Subject to any disclaimer, the term of this patent is extended or adjusted under 35 U.S.C. 154(b) by 122 days.

(21) Appl. No.: 10/432,832

(22) PCT Filed: Nov. 26, 2001

(86) PCT No.: PCT/EP01/13768
§ 371 (c)(1),
(2), (4) Date: Jun. 24, 2003

(87) PCT Pub. No.: WO02/43406
PCT Pub. Date: May 30, 2002

(65) Prior Publication Data
US 2004/0072590 A1  Apr. 15, 2004

(30) Foreign Application Priority Data
Nov. 24, 2000  (IT) .......................... TO2000A1104

(51) Int. Cl.
*H04Q 7/20* (2006.01)
(52) U.S. Cl. .................... 455/433; 455/555; 455/554.1
(58) Field of Classification Search ............. 455/414.1, 455/433, 554.1, 555, 552.1, 560, 561
See application file for complete search history.

(56) References Cited

U.S. PATENT DOCUMENTS 5,999,813 A   12/1999 Lu et al.
6,122,510 A *  9/2000 Granberg .................... 455/433
6,366,773 B1*  4/2002 Ihara et al. .................. 455/419
6,389,283 B1*  5/2002 Sanchez Herrero ......... 455/433
6,640,108 B1* 10/2003 Lu et al. ..................... 455/463
6,684,073 B1*  1/2004 Joss et al. ................... 455/433
2005/0130654 A1* 6/2005 Di Claudio et al. ........ 455/433

FOREIGN PATENT DOCUMENTS

| DE | 196 18 531 | 10/1997 |
| EP | 0 863 685 | 9/1998 |
| WO | WO 99/48311 | 9/1999 |

* cited by examiner

*Primary Examiner*—Joseph Feild
*Assistant Examiner*—Anthony S. Addy
(74) *Attorney, Agent, or Firm*—Herbert Dubno

(57) ABSTRACT

A supranational and inter-PLMN physical private mobile telecommunications network includes at least one first (1) and one second (2) physical node that can cooperate with the respective different public mobile networks (PLMN1, PLMN2), , , ) referably located in different countries. These physical nodes have respective: functionalities selected from the group consisting of: masking functionality (M1, M2) to handle the interworking with the respective public mobile network (PLMN1, PLMN2), filtering functionality (F1, F2) to analyze the numbering of the internal call d/calling customer in relation to the identity of the calling/called party, a functionality managing the coordination and intelligent services (INCI, INC2), which can control the call between the physical node of origin and the physical node visited, and thus permits the management of the virtual user mobility between the physical nodes as they are involved as well as the: invocation of the intelligent services provided inside the different physical nodes, and
an interworking functionality (ITW1, ITW2) configured so as to permit the interworking between signalling on Internet Protocol network (IP) and a circuit-switching signalling.

19 Claims, 2 Drawing Sheets

PHYSICAL PRIVATE MOBILE TELECOMMUNICATIONS NETWORK

CROSS REFERENCE TO RELATED APPLICATIONS

This application is a national stage of PCT/EP01/13768 filed 26 Nov. 2000 and based upon Italian national application to 2000A001104 of 24 Nov. 2000 under the International Convention.

FIELD OF THE INVENTION

This in invention relates to a telecommunications network of the type currently referred to as a physical private mobile network, or in more commercial terms, "wireless office", "wireless enterprise" or "wireless PBX solution".

BACKGROUND OF THE INVENTION

For networks of this type it is important to be able to integrate them with systems that have already been installed, such as a LAN (Local Area Network) based on IP (Internet Protocol) technology and that are located in a corporate realir4 with the possible presence of a PABX type corporate switchboard (Private Automatic Branch eXchange).

All this bearing in mind the fact that networks of this type are typically destined to be employed in a supranational context, given that they are aimed at enterprise-is that have offices and branches in different countries. At least two private radiomobile systems have been proposed, that aim to satisfy, at least partially, the afore-mentioned requirements.

One system, produced by the American company Interwave, is called GSM in A Box or Network in A Box. This system is commercialized in Europe by Nortel Cellular under the trade name Piconode.

Another system is that proposed by the Swedish company Ericsson under the tradename Line of Ericsson GSM On A Net (EGON).

The first system mentioned above (henceforth referred to as Piconode for the sake of brevity) is interconnected via a GSM (Global System for Mobile communication) standard A interface to a corresponding PLMN network (acronym for Public Land Mobile Network) and via a PRI interface to a corresponding PSTN network (Public Switched Telephone Network). In a more recent variation, the interface to the PLMN is made with IP transport (Internet Protocol).

In more recent variations, the manufacturer has positioned the BTS's (Base Transceiver Station) on the 1P network and subsequently the A interface also.

The P:conode solution can produce multi-site, multi-node networks, but not "supra national" networks, i.e. PLMN and/or PSTN networks handled in different ways (usually by different operators) in different countries.

The term "supranational" dearly refers to the context that is currently prevalent in the telecommunications sector, at least at the European level. It should, however, also tie understood to refer to the possibility of interfacing with different PLMN and or PSTN networks connected to different operators within the same country.

To return to the description of the Piconode system, however, one of the main innovations is that a user profile has been introduced to distinguish between public us r, hybrid user and private user.

The pubs is user is only recognized by the public network Home Location Register HLR, the private user only by the Piconode network HLR, while the hybrid user is recognized by both HLR's. Mobility is handled by circuit signaling as per the GSM standard.

The Piconode system does not offer new services that differ from the normal PLMN network, but exploits some of its special characteristics. In particular, it does riot have the capability to interwork with other corporate databases that contain sensitive data.

One interesting aspect of the Piconode system is that it routes calls that originate at its input. This routing is carried out on the basis of information reside::it in tables that can only be changed by the network administrator. The system therefore permits call routing, but not by the user, which means a service called "Incoming Call Screening" (or ICS) cannot be configured Full flexibility is therefore not possible, which is an important factor in the ICS service in a "corporate" environment.

The Ericsson system called EGON is based on the ITU T Recommendation H.32 3, which describes the terminals, the equipment and services for multimedia communication over a packet-based network.

The basic concept of H.323 is that of keeping call control and connection control separate once established.

The EGON solution gives all business users of the corporate Intranet network the opportunity to use the user terminal mobility within the IP network.

One of the main EGON system characteristics is the fact that the corporate Intranet network can be accessed by GSM mobile terminals, IP fixed telephones and personal computers in order to give the corporate users total mobility. Roaming is possible on the GSM public network.

System architecture is based essentially on the presence of three different nodes c filled Service Node, Access Node and Application Node plus two gateway functimialities, Signaling Gateway and Voice Gateway.

The service node is the core of the service and as such is responsible for the following functions:

call setup and routing, uw er administration, and handling of security and services offered.

As regards call setup and routing, the service node controls all the ells made between different types of terminals and translates the addresses between different types of access, for example between PSTN telephone numbers and addresses in the system.

User administration has the task of handling all users with registered system identity and service profile. The profile lists all the services to which the user has access.

Management of security and the services offered includes functions of authentication, resource management and least-cost routing. This function includes an API (Application Program Interface) for high-level access and applications (voice mail and fax, e-mail, web-initiated dialling and other vertical applications).

The access node enables GSM mobile terminals to access the system by handling system radio resources and the mobility of the users in the network.

The access node is involved whenever a call is set up to or from a GSM mobile terminal IL The node does not carry any traffic information, but controls communication between the GSM mobile terminals involved. It can interrogate the Home Location Register (MR), manage the roaming numbers and run/control the paging and handover processes.

In terr is of the public GSM network, the access node and its underlying structure are perceived as a Location Area within the corporate network. The application node enables high level applications to interact with the system through an API. Available applications are:

Web-initiated Dialling,

Directory-assisted Dialling unified messaging service, and simplified integration with LAN-based business support systems.

The signaling gateway respectively translates between the typical protocol architecture levels on a common channel in circuit-switching mode in the TCP/1:P protocol (Transmission Control Protocol/Internet Protocol) for signaling information transport, and in packet-switching mode within the EGON system IP network.

The voice gateway translates the voice communications between the circuit switching; public networks and the packet-switching private IP type EGON network. The voice gateway is capable of examining fax and voice type calls from the circuit-switching public networks and transfer them in an appropriate format to the packet-switching EGON system IP network. At the same time it is capable of examining voice and fax calls forwarded from terminals inside the EGON system IP network and reconstruct the data flow before transmitting it on the circuit-switching public networks.

One of the critical aspects of the EGON system is the complexity of the IP protocol 1 required to ensure, on the one hand, the physical possibility of performing the multimedia services inside the system, and on the other hand, the presence and co-existence of the fixed and mobile terminals and the network equipment described in ITU-T recommendation H.323.

Another critical aspect is the need to provide a gateway for the translations involving the protocols referred to previously, signaling information and voice and data services that transit between circuit-switching public networks PSTN and PlMN and the packet-switching IP EGON network. This system, in addition, is currently not capable of masking the management of employee mobility between the physical national corporate nodes as they are involved, for the external public networks.

The system is also currently not able to ensure one of the requirements considered important by the corporate customer, i.e. total reachability of an employee, be he/she under public or private domestic coverage or under public or private visited coverage as a roamer user.

Other critical aspects of the system are related to the portability of the integer,. network services based on mechanisms and protocols of the proprietary type between two physical nodes in a physical private supranational network. This apples, for example, for the possible activation of the intelligent services resident in a physical, domestic node from a visited physical node. In other words, the user that is roaming on a physical visited node cannot, from remote, use a set of services based on an intelligent network and located on the domestic node of the corporate network.

OBJECT OF THE INVENTION

The aim of this invention is to create a physical private mobile network capable of overcoming the problems described above with reference to some already well-known systems.

SUMMARY OF THE INVENTION

A physical private mobile telecommunications network, according to the invention includes at least one first and at least one second physical node, which can co-operate with respective different public mobile networks, said first and second physical node having the respective following functionalities:

a masking functionality for managing the interworking with the respective public mobile network and for managing a virtual user mobility between physical nodes as they are involved, a filtering functionality for analyzing the number of the internal customer called/calling in relation to the caller/called party identity in order to ensure that the call treatment methods, registered in the corresponding profiles, and the Incoming Call Screening functionality are carried out, an Intelligent services and coordination management functionality, which can set up the call between physical node of origin and visited physical node, and permits the invocation of intelligent services inside the different physical nodes and/or made available by the public networks and an interworking functionality configured to allow interworking between the circuit-switched signalling, preferably on the GSM A interface, and the signalling on the Internet Protocol network (IP).

The first and the second physical nodes cooperate with the said respective different public networks via interfaces to the respective MSC/VLR nodes of said respective public networks.

The Interface can be an A interface.

The first and second physical nodes include a functionality that can be used to perform switching activities connected to a respective local PAB, and can be used to exchange signalling information with a respective public fixed network.

Th respective public networks can be located in different countries.

The signalling information, the voice and data services on this network can travel on the Internet Protocol network (1P), preferably in VoIP mode.

The masking functionality can be configured to simulate the G'; M standard protocol, in particular interface A to the MSC/VLR node of the respective public mobile network to which the respective physical node is connected, and can be configured to manage die virtual user mobility between the physical nodes as they are involved.

The masking functionality can be configured to generate the messages needed for user mobility management, call management and radio resources management both when activation comes directly from a mobile terminal, and when it is induced by the filtering functionality.

The first and second physical nodes include a respective database containing visitor user profiles, and by the fact that said filtering functionality responds to the masking functionality to examine the incoming/outgoing CAN, and consequently the masking functionality sees to the activating of said coordination functionality after consulting the profile in the respective visitor user database, and therefore the visitor users belong to public networks of other operators being managed as per these methods.

The first and second physical nodes include a respective database containing visitor user profiles, and by the fact that said functionality for the management of the intelligent services is configured to allow the use of services managed by the respective physical node as if each visitor user were on the respective physical node of origin.

The first and second physical nodes include a respective resident user database containing the profiles of the users defined on the respective physical node.

The resident users database includes a user profile for each resident user containing the following information:

access rights to the telecommunications services for the respective resident user, instructions required for the management of intelligent services, the users associated to said database are users connected to the different public networks.

The resident user database includes the capability to retrieve information from corporate databases containing sensitive company data that is necessary to provide a total reachability service.

The first and second physical nodes also include a network user reachability service, which means that any other calling user connected to a network physical node i.e. on the respective public mobile network can be directly connected to the user called over the same telecommunications network.

Telecommunications network can also be configured as desired by the user in order to search for the real position of the user in the network by signalling, with this consequent possibility of retrieving information on the real whereabouts of said user, preferably together with the attributes associated to in the network environment.

The communication between at least first and at least one second physical node can take place on a section of the Internet Protocol network (IP) reserved to the network. The telecommunications network can then be configured to use abbreviated dialling for the call between at least a first and at least a second physical node.

The masking functionality, said filtering functionality and said coordination functionality are con gored to simultaneously manage a real user mobility between cells relating to said first and second physical nodes and a virtual mobility with respect to said respective different public mobile networks.

The first and second physical nodes can possess a group of said respective functionalities in combination with each other.

In short, the application range for the solution expounded in this invention is the transport of voice, data and signaling. The solution given in this invention uses the transport on EP networks where these are present, even though this is not an essential pre-requisite. The solution, in fact, adapts itself to other means of transport that are less innovative than the packet-switching networks.

The solution adapts itself in a particularly advantageous way to a context of physical private supranational networks that use the corporate IP intranet network. In more general terms, it adapts to connection with PLMN and/or PSTN networks that are different from one another. As such, the solution according to the invention can be used to advantage by all the companies with offices and branches in different countries.

The preferential application scope of the solution according to the invention is therefore the world of large and medium-sized businesses. The same solution however, can also be applied in the case of small businesses or professional studios.

The solution offered by the invention is able to provide the following services: management of a virtual user mobility, depending on the private radiomobile network;

total user reachability;

per;:ability of the intelligent network services; and possible choice of the ways of routing the outgoing calls from the private radiomobile network made directly by the corporate customer.

The management of a virtual user mobility is considered extremely important by the corporate client, especially by large and medium-sized businesses, in that it allows the company to mask the mobility of an employee to all the different PLMN's (usually located in different countries) where there is one or more nodes for the company's physical private mobile network. In this way, wherever an employee moves away from a physical corporate node in a given network, e.g. national, and moves to another physical node in the corporate network, which may be in another country the corresponding PLMN networks involve 'd have no way of realizing that any move has been made.

The management of virtual user mobility is enabled by a masking functionality that al lows the corporate employees to make voice and data calls involving, for example, two different company offices without using the international public interconnection sections.

Total user reachability is considered essential by the corporate customer since it means that It is possible to have constant information of an employee's physical whereabouts in an international context.

The portability of the intelligent network services can be based on standard solutions or solutions in the process of being standardized such as CAMEL PHASE 1, PHASE 2, PHASE 3, PHASE 4 and more generically, on proprietary solutions, The portability of the intelligent network services between several offices of the private radiomobile supranational corporate network is a requisite deemed strategic by many corporate customers, in that it allows a company employee roaming on the corporate visited physical node to use, from remote, all the services in the corporate resident physical node by activating the service logic to which they are associated.

Finally, the possibility of choosing the ways of routing the outgoing calls is an important requisite in that it allows the corporate customer to directly manage the cost, associated to all the calls outgoing from the physical "national" node destined to another physical node of the corporate network, which may be in another country.

The installation and the operation of the solution according to the invention can be easily integrated and are advisable if there is a private telecommunications network such as a LAN based on Internet Protocol technology (LAN IP) and located in the corporate environment with possibly a PABX company switchboard. The solution has been developed paying particular attention to the possible application to second-generation technologies such as GSM and GPRS (General Packet Radio Services), and to the third-generation mobile technologies such as UMTS (Universal Mobile Telecommunication System) and IMT20000.

The invention basically configures the network as a supranational network in that, on the one hand it permits interconnection with different PLMN networks (usually in different countries), and on the other hand, it recognizes and distinguishes the different nationalities of the users subscribed to the different nodes on the same physical private mobile network that is physically located in different countries. This results in considerable savings in the general management of corporate telecommunications traffic as it combines the reachability function with the functions of mobility, routing and signaling management.

The users in individual countries are customers of the public mobile network operator in that country. Each branch uses, therefore, has a SIM (Subscriber Identity Module) that belongs to the public mobile network operator of the country in which it operates.

BRIEF DESCRIPTION OF THE DRAWING

The invention will now be described with a purely non-limiting example and the annexed drawing in which.

SPECIFIC DESCRIPTION

Figure 1:
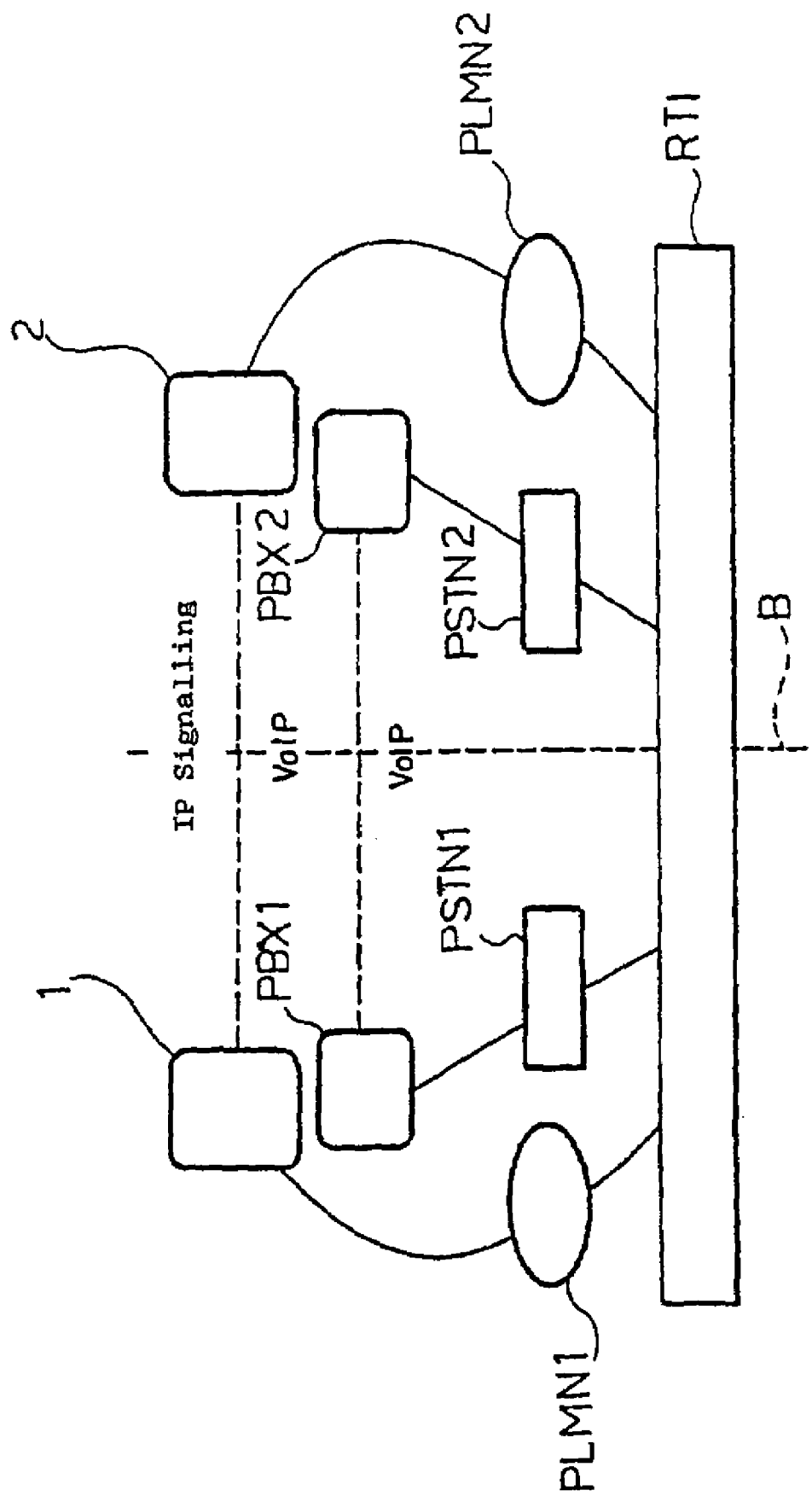
FIG. 1 is a schematic drawing of the overall architecture of a network according to the invention.

FIG. 1 basically illustrates the possible co-existence and the methods of network interconnection with mobile networks PLMN1 and PLMN2 that are different from each other.

The following description supposes that, as occurs in the majority of cases at least; a the present moment, the two physical nodes of the network in question are located in two different countries that are divided by a frontier represented by dished line B.

The same considerations apply for the corresponding fixed networks PSTN1 and PSTN2.

Generally speaking, it is supposed that the PLMN1, PLMN2, PSTNI and PSTN2 networks can communicate with each other using well-known methods, via an international transit network, called RTI.

It should be remembered that the solution as described in the invention can be applied to contexts where there are different PLMN1 and PLMN2 mobile networks and/or different PSTN1, PSTN2 fixed networks, which can interact with each other through an RTI transit network regardless of their location in different countries. As already mentioned, the reference to different countries is dictated by the fact that the current prevalent situation envisages that the networks illustrated in FIG. 1 and distinguished with the numbers 1 and 2 are physically located in different countries.

Specifically, the diagram in FIG. 1 is intended to illustrate the possibility of co-existence and the methods of interconnection between the physical private mobile network, invention, and the mobile networks PLMNI and PLMN2 that serve two international offices of the same business.

Reference to the IP signalling indicates the main network protocol adopted for the exchange of signalling information within the network, while the reference VoIP relates to the method of transmission of the voice between two physical nodes, 1 and 2 respectively, located in the physical private mobile network. Two corresponding switchboards, PBX1 and PBX2, are also illustrated.

It should be noted that, even if for simplicity's sake the description refers to only two physical nodes, 1 and 2, the solution given in the invention generally envisages the presence of n number of physical nodes.

Figure 2:
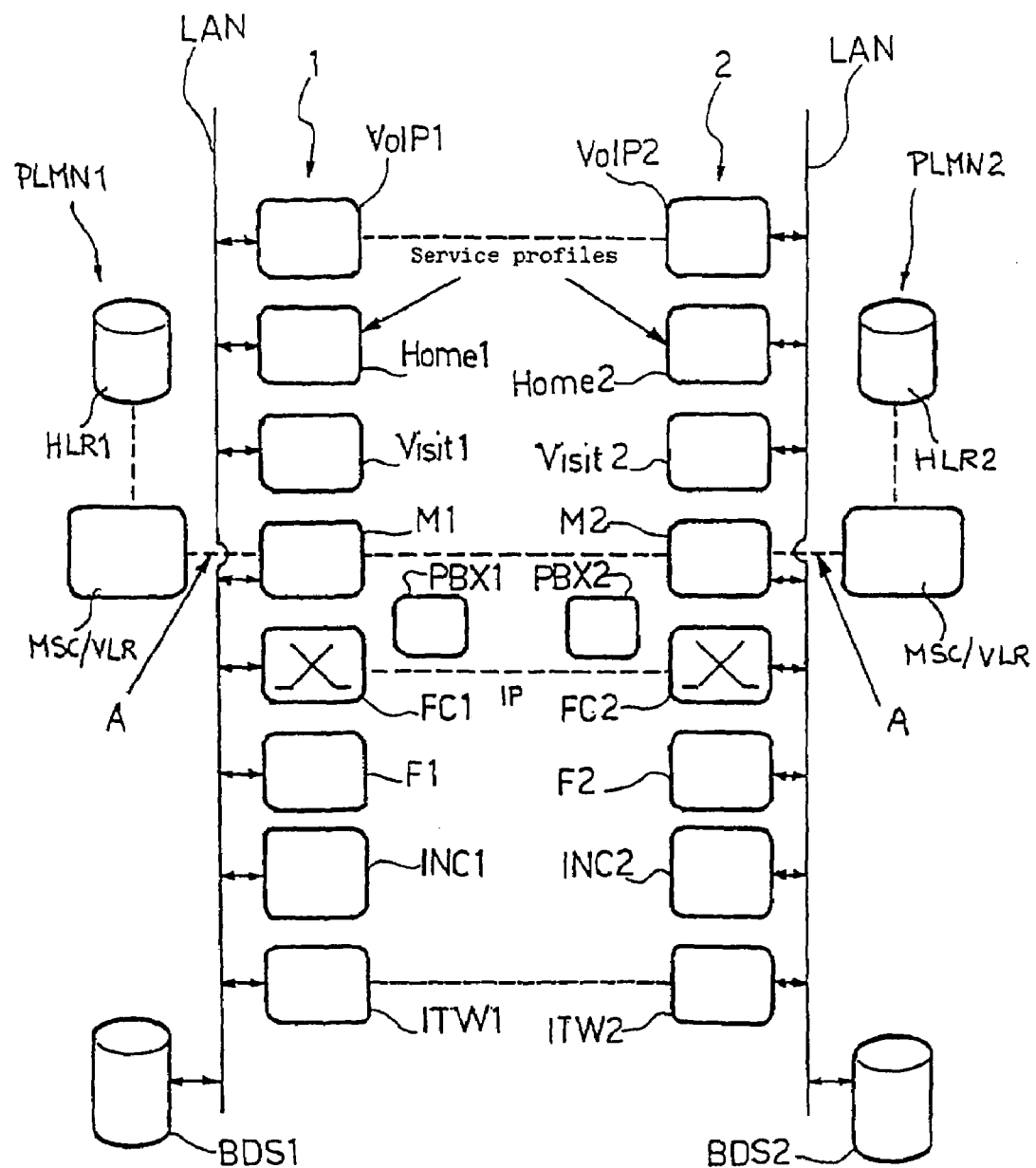
FIG. 2 is a functional block diagram that illustrates the architecture of two physical nodes in a network according to the invention.

Both physical nodes 1 and 2, the structure of which is illustrated in greater detail in FIG. 2, include the functionalities of radio resources, switching, control acid database containing user profiles and service logics of all the company employees that use the system as per the invention.

FIG. 2 illustrates the detailed architecture of the methods of interaction between the two nodes 1 and 2, and the interaction with the public networks PLMN1, 1?LMN2, PSTN1 and PSTN2.

In particular, physical node 1, assumed to be located in one country, is connected directly via interface A to an MSC (Mobile Switching Center)/VLR (Visitors Location Register) module of the PLMN1 network, whose respective Home Location Register is referred to as HLRI.

In exactly the same way, physical node 2, assumed to be located in another country is connected directly via interface A to the MSC/VLR of the PLMN2 network.

Given the aforesaid basic symmetry, the following description refers explicitly to the features of one of the nodes 1, 2, and it should be understood that what is specified for one of the nodes should be taken to apply to the other node also, fli a respective parts being identified with the numbers 1 and 2.

Each physical node, 1, 2 of the physical, private mobile network as referred to in the invention, allows an FC functionality able to perform switching activities. This function is connected to the local PABX (PBX1, PBX2), which can exchange signalling information with the fixed public network. An interworking (ITW) functionality is therefore associated with the PABX, which means that the circuit ..switched signalling can be translated into VbIP signalling and vice versa.

All the signalling information, the voice services and the data services are transported on the EP network inside the network as per the invention. Generally, the physical nodes 1 and 2, each connected via interface A to the respective public radiomobile network, are connected to each other via a specific proprietary protocol or via known standardized protocols for the mobility management of each user between the physical nodes, the management of the user profiles and the service logics between the physical node of origin and the visited physical node, the setup of the voice call between the physical nodes, the coordination of actions co-related between the physical node of origin and the visited physical node, The first hypothesis of connection between the nodes makes the invention particularly efficient.

Signalling information is exchanged between the two physical nodes 1 and 2 via the aforementioned proprietary or standardized protocols, which refer to the IP transmission standards.

Each physical node envisages the following functionalities:

Mi., M2 masking: dedicated to the management of the interworking with the PLMN1 and PLMN2 networks via interface A, and to the management of a virtual user mobility between the physical nodes as they are involved; F1, F2 filtering: supervises the analysis of the identification number of the internal customer called/calling in relation to the caller/called identification in order to ensure that the call treatment methods, given In the corresponding profiles and actuated by the masking functions M1, M2, and the Incoming Call Screening functions are all carried out; intelligent services logics plus coordination INC1, INC2: supervises the coordination functions connected to the setup of the call between the physical node of origin and the visited physical node and permits, for example, the invocation of the intelligent network service logics that already exist and are resident inside physical nodes that are geographically distant from each other it also supervises the invocation of the intelligent network service logics that are made available by the PLMN1 and the PLMN2; and ITW1, ITW2 interworking: executes the interworking between circuit switched signalling on interface A and the signalling on IP network.

The PABX interfaces with the PSTN fixed public network.

Consequently there is an element that acts as gateway between the PABX and the switchboard of the PSTN public fixed network.

The voice calls are executed in VoIP mode.

The database functionalities can be sub-divided further into a residents database Home1, Home2 and a visitors database Visits and Visit2.

The rest cents database Home 1, Home2 contains user profiles defined on a specific physical node. The user profile contains the various access rights to the telecommunications services, both as regards call generation and reception, as well is supplementary services. The profile also contains the instructions required. to manage the services normally provided by the intelligent network. The resident database is connected to corporate database BDS1, BDS2 on the corporate LAN EP, which contains the information that permits total user reachability.

The visitors database Visit1, Visit2, on the other hand, contains the data of the users visiting the visited physical node office. The data contained permit the use of the telecommunications services (including all the intelligent network services) as if the user were at the physical node of origin.

The invention permits each calling user, connected to the physical node of a system. country or connected to the public mobile network of a country, to be connected, directly and via an IP connection between the two physical nodes, to the user called that is connected to the visited physical node or on the public mobile network of another country. Once the appropriate checks to confirm the physical whereabouts of the employee have been carried out, the call is set up by making a connection on the IP network between the two physical nodes.

The M1, M2 masking functionality makes simulation of the GSM standard protocol interface A possible on the MSC/VLR node of the public network (PLMN1 or PLMN2) to which the physical node is connected. The masking functionality also permits the generation of messages needed to handle user mobility the calls and the radio resources. This happens both when it is activated directly from the mobile terminal, and when it is commanded by the filtering functionality.

The M1, M2 masking functionality examines the incoming/outgoing calls, consult the call treatment profiles and the user reachability information in the F1, F2 filtering functionality and in the BDS1, BDS2 sensitive database respectively, then forwards this information to the coordination functionality responsible for setting up the physical connections for call activation.

As shown in FIG. 2, communication between the various functionalities is ensured via connection, for example, on the corporate LAN. The same FIG. 2 also: shows there is a sensitive database, BDS1, BDS2 on each physical node.

The solution given in the invention therefore offers real mobility between cells of diff !rent physical nodes of the same network, and a virtual mobility as regards the public radiomobile networks PLMN1, PLMN2 via the M1, M2 masking functionality and the F1, F2 filtering functionality. Another advantage is to be found in the possibility of generating signalling messages suitable for masking the user mobility, otherwise perceived as real by the PLMN network, via the A interface of the GSM system.

This possibility can be carried out in all cases in which the mobility encloses itself between physical nodes of the physical private mobile network and assumes ILL purely virtual nature. In this way it is possible to save on international traffic distributed via the potential offered by IP network transmission.

The solution, as per the invention, also offers total user reachability on the physical private mobile network. This relates to the integrated management mode of the users connected to different system physical nodes, which are connected to PLMN networks that belong to operators located in different countries s. In this way, the users can be considered as belonging to a single mobile supranational PABX. Inside the network referred to in the invention, in fact, the search for the real position of the user is carried out by means of signalling, and more important, without necessarily having to set up rails in circuit car packet mode. Anyone, therefore, who has access to the LAN IP associated to the network, referred to in the invention, can, if authorised, retrieve information on the real position of another system user together with all the attributes associated with that user registered inside the system.

There is also the possibility of abbreviated dialling to call a user connected to a physical node, possibly international, from another physical node in the network. This possibility can be set in action by using a proprietary protocol on the international section of the IP network reserved for the company. In this way there is no use of the intelligent network mechanism based on the protocols that are already standardized or in the process of standardization, such as the protocol called CAMEL PHASE 1, PHASE 2, PHASE 3, PHASE 4.

Obviously the details of how this is done can be altered with respect to what has been described and illustrated, without however, leaving the context of this invention.

The invention claimed is:

1. A physical private mobile telecommunications network, comprising at least one first physical node and at least one second physical node, which can co-operate with respective different public mobile networks, said first physical node and second physical node having the respective following functionalities:
   a masking functionality for managing interworking with the respective public mobile networks and for managing a virtual user mobility between physical nodes as said physical nodes are involved, a filtering functionality for analyzing a number of an internal customer called/calling in relation to the caller or called party identity in order to ensure that respective call treatment methods registered in corresponding profiles, and an Incoming Call Screening functionality are carried out an intelligent services and coordination management functionality setting up a call between physical node of origin and a visited physical node, and intelligent services inside respective physical nodes or made available by the public networks; and
   an interworking functionality configured to allow interworking between circuit-switched signalling on a GSM A interface, and signalling on Internet Protocol network (IP).

2. The telecommunications network defined in claim 1 the first and the second physical nodes cooperate with said public networks via interfaces to respective MSC/VLR nodes of said respective public networks.

3. The telecommunications network defined claim 2 said interfaces are A interfaces.

4. Telecommunications network defined in claim 1 wherein said first and second physical nodes include a functionality that performs switching activities connected to a respective local PABX, and exchanges signalling information with a respective public fixed network.

5. The telecommunications network defined in claim 1 wherein said respective public networks are located in different countries.

6. The telecommunications network defined in claim 1 wherein the signalling information, voice and data services network travel on an Internet Protocol network (1P) in VoIP mode.

7. The telecommunications network defined in claim 2 wherein said masking functionality is configured to simulate GSM standard protocol in interface A to a MSC/VLR node of the respective public mobile network to which the respective physical node is connected, and is configured to manage virtual user mobility between the physical nodes as they are involved.

8. The telecommunications network defined in claim 2 wherein said masking functionality is configured to generate messages needed for user mobility management, call management and radio resources management both when activation comes directly from a mobile terminal, and when it is induced by the filtering functionality.

9. The telecommunications network defined in claim 1 wherein said first and second physical nodes include respective databases containing visitor user profiles, and said filtering functionality responds to said masking functionality to examine incoming and outgoing calls, and activation of said intelligent services and coordination management functionality after consulting a profile in a respective visitor user database.

10. The telecommunications network defined in claim 1 wherein said first and second physical nodes include a respective database containing visitor user profiles, and said functionality for the management of the intelligent services is configured to allow the use of services managed by the respective physical node as if each visitor user were on a respective physical node of origin.

11. The telecommunications network defined in claim 1 wherein said first and second physical nodes each include a respective resident user database containing profiles of the users defined on the respective physical node.

12. The telecommunications network defined in claim 11 wherein resident users database includes a user profile for each resident user containing the following information:
   access rights to the telecommunications services for a respective resident user, and
   instructions required for the management of intelligent services.

13. The telecommunications network defined in claim 11 wherein said resident user database permits retrieval of information from corporate databases containing sensitive company data.

14. The telecommunications network defined in claim 1 wherein said first and second physical nodes also include a network user reachability service for directly connecting any calling user connected to a network physical node on the respective public mobile network to the to a user called over the same telecommunications network.

15. The telecommunications network defined in claim 1 to search for a real position of a user in the network by signalling, retrieving information on a real whereabouts of said user together with attributes associated to said user in the network environment.

16. The telecommunications network defined in claim 1 wherein communication between at least a first and at least a second physical node takes place on a section of Internet Protocol network (IP) reserved to the network.

17. The telecommunications network defined in claim 1 configurable to use abbreviated dialing for a call between at least a first physical node and at least a second physical node.

18. The telecommunications network defined in claim 1 wherein said masking functionality said filtering functionality and said intelligent services and coordination management functionality are configured to simultaneously manage a real user mobility between cells relating to said first and second physical nodes and a virtual mobility-with respect to said public mobile networks.

19. The telecommunications network defined in claim 1 said first and second physical nodes possess a group of said respective functionalities in combination with each other.

* * * * *